May 3, 1938.  F. E. CHERNOSKY  2,116,302
FLUID CONDUCTING LINE
Filed May 4, 1936

Inventor
Frank E. Chernosky
By
Hardway Cathey
Attorneys

Patented May 3, 1938

2,116,302

UNITED STATES PATENT OFFICE 2,116,302

FLUID CONDUCTING LINE

Frank E. Chernosky, Newgulf, Tex.

Application May 4, 1936, Serial No. 77,651

5 Claims. (Cl. 138—47)

This invention relates to a fluid conducting line and has particular relation to means for supporting the line within the surrounding shield.

An object of the invention is to provide a line for conducting hot fluid such as hot steam, hot water, hot liquid sulphur or other hot fluid, said line being surrounded by and supported in a shield to the end that the temperature of the fluid being conducted will not be substantially reduced by the cold surrounding air.

Shielded lines of this character are commonly used for conducting hot steam to be forced down into a sulphur mine or well for melting the sulphur therein whereby it may be brought to the ground surface in fluid state, although as above stated a shielded line of this character may be used anywhere for conducting hot fluid and shielding the same from surrounding cold air. Lines of this character are commonly used about sulphur mines and it is well known that as the sulphur is brought to the surface from the mines the contour of the ground surface varies or changes and consequently there is a certain amount of movement of the lines laid along the surface of the ground; also there is a certain amount of movement of lines conducting hot fluid wherever located or used due to variations in temperature.

It is an object of the present invention to provide means for supporting the conducting line within the surrounding shield, whereby the line will be permitted to move in accordance with variations in the ground surface and in accordance with variations in temperature without crushing or injuring the surrounding shield and whereby the conducting line will be maintained approximately at the center of the shield notwithstanding movements of the line.

With the above and other objects in view, the invention has particular reference to certain novel features of construction, arrangement of parts and use, an example of which is given in this specification and illustrated in the accompanying drawing, wherein.

Figure 1:
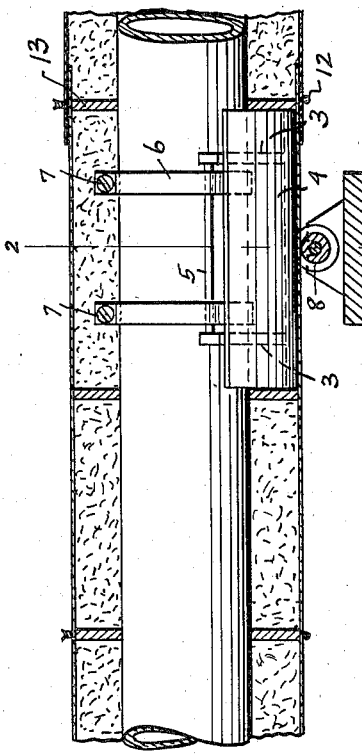
Figure 1 shows a longitudinal sectional view of the conducting line.
Figure 2:
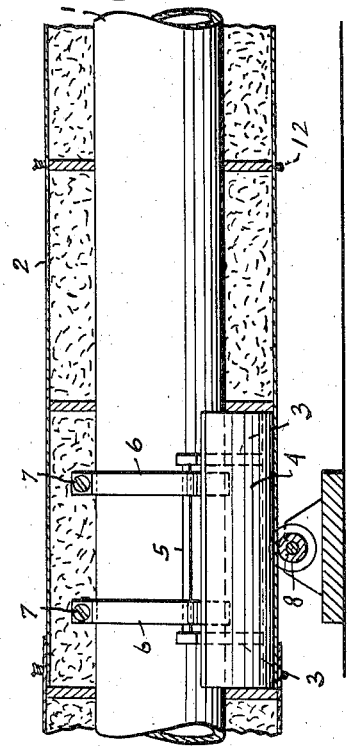
Figure 2 shows a cross sectional view taken on the line 2—2 of Figure 1.
Figure 3:
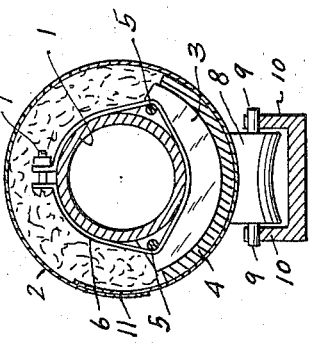
Figure 3 shows a fragmentary longitudinal sectional view showing the pipe support in section.

Referring now more particularly to the drawing, wherein like numerals of reference designate the same parts in each of the figures, the numeral 1 designates a pipe for conducting steam or other hot fluid. This pipe is surrounded by a shield 2 of thin sheet metal which is spaced from the pipe.

It is desirable that the pipe 1 be centrally supported in the shield 2 and for this purpose there is provided the arcuate flanges 3, 3 within which the pipe 1 is seated and secured to the lower margins of these flanges 3, by welding or otherwise, there is an arcuate base 4 of relatively thick material which fits the contour of the bottom of the shield 2. The ends of the flanges 3 are connected in any preferred manner as by the rods 5, 5 and suitable straps 6, 6 are fitted around the pipe 1, as well as around the rods 5 and the free ends of these straps are secured together by bolts 7. The shield 2 rests on the transverse convex roller 8 which is located directly underneath the base 4 and the roller 8 has the end pintles 9 which rotate in suitable notches in the side legs or brackets 10, 10. A firm support for the pipe 1 is thus provided and it is to be here noted that the supporting means will be spaced along the pipe 1 the required distance apart to form a secure support for said pipe.

The shield 2 is open on one side with its adjacent margins overlapping as at 11 and tie wires 12 surround the shield at intervals along the length thereof with their ends twisted together as shown.

It will be understood that the inner pipe 1 will be wrapped or surrounded with insulating material. If this material is of such a nature as to require the annular partitions 13, they may be fitted around the pipe 1 and fitted closely within the shield 2. These partitions, if used, will be spaced the required distance apart and will also serve to maintain the shield centered about the pipe. If the inner pipe is wrapped with sheet asbestos or other insulating material is used not requiring partitions 13, they may be omitted.

As the pipe moves under any of the conditions hereinabove referred to it will move on the rollers 8, the bases 9 on the supporting means moving with the pipe and these bases are made of a length such that the pipe will have the required range of movement, the rollers 8 remaining under the bases irrespective of the pipe movement to the end that the surrounding shield will not be crushed from the weight of the pipe and the pipe 1 will remain centered within the shield.

It will thus be noted that the centering means hereinabove described is located within the shield and said shield will have no openings to admit outside cold air and will thus be protected against variations in the outside temperature.

The drawing and description disclose what is now considered to be preferred form of the invention by way of illustration only while the broad principle of the invention will be defined by the appended claims.

What I claim is:—

1. In combination a fluid conducting pipe, a shield therearound and spaced therefrom, an arcuate base of relatively thick material within the shield and underneath the pipe, spaced arcuate flanges secured on the base and forming legs on which the pipe rests, flexible tie members connected to the flanges and detachably secured around the pipe.

2. In combination a fluid conducting pipe, a pipe support comprising an arcuate base, a shield surrounding said pipe and base, said base being of relatively thick material, spaced arcuate flanges secured on the base and forming upstanding legs to receive the pipe, rods connecting the flanges, a flexible tie member adapted to surround the rods and the pipe supported on the said legs and to tie the base to the pipe and whose ends are detachably secured together.

3. In combination a fluid conducting pipe, a tubular shield around and spaced from the pipe, an arcuate base of relatively thick material fitted closely within the shield underneath the pipe, spaced arcuate flanges secured on the base and forming upstanding legs extending transversely of the pipe and on which the pipe rests, flexible tie members connected to the flanges and detachably secured around the pipe, supporting means shaped to conform to the contour of the shield and arranged underneath the shield opposite the base, said base being of sufficient length to allow longitudinal movement of the base without displacing the base from the supporting means.

4. Supporting means for a fluid conducting pipe having a tubular shield around and spaced from the pipe; comprising an arcuate base of relatively thick material shaped to fit closely within the shield underneath the pipe, spaced flanges secured on the base and forming upstanding legs whose upper margins are arcuate to receive the pipe, rods whose ends are anchored to said flanges, flexible tie members of a length to surround said rods and the pipe, means for detachably securing the ends of said tie members together, supporting means shaped to conform to the contour of the shield and arranged underneath the shield opposite the base, said base being of sufficient length to allow longitudinal movement of the pipe without displacing the pipe from the supporting means.

5. In combination a fluid conducting pipe having a tubular shield around and spaced therefrom, an arcuate base of relatively thick material located within and shaped to conform to the shape of, and to fit against, the shield underneath the pipe, arcuate flanges spaced apart and rigidly secured to the base and forming upstanding legs whose upper margins are shaped to conform to the shape of and to receive the pipe, rods on opposite sides of the pipe whose ends are anchored to said flanges, flexible straps surrounding said rods and also surrounding the pipe, means for detachably securing the ends of said straps together, supporting means shaped to conform to the contour of the shield and arranged underneath the shield opposite the base, said base being of sufficient length to allow longitudinal movement of the pipe and shield without displacing the base from the supporting means.

FRANK E. CHERNOSKY.